United States Patent [19]
Tai et al.

[11] Patent Number: 5,371,618
[45] Date of Patent: Dec. 6, 1994

[54] COLOR LIQUID CRYSTAL DISPLAY EMPLOYING DUAL CELLS DRIVEN WITH AN EXCLUSIVE OR RELATIONSHIP

[75] Inventors: Chen-Yu Tai; Han Zou, both of Toledo, Ohio

[73] Assignee: Brite View Technologies, Toledo, Ohio

[21] Appl. No.: 470

[22] Filed: Jan. 5, 1993

[51] Int. Cl.⁵ .................... G02F 1/133; G02F 1/137; G02F 1/1335
[52] U.S. Cl. ........................ 359/53; 359/66; 345/4; 345/88; 345/98
[58] Field of Search .................. 359/53, 84, 85, 41, 359/66; 345/87, 88, 4, 98, 100; 353/30, 31

[56] References Cited
U.S. PATENT DOCUMENTS

| | | | |
|---|---|---|---|
| 4,239,349 | 12/1980 | Scheffer | 359/53 |
| 4,416,514 | 11/1983 | Plummer et al. | 359/53 |
| 4,838,655 | 6/1989 | Hunahata et al. | 359/53 |
| 4,842,379 | 6/1989 | Oishi et al. | 359/53 |
| 4,886,343 | 12/1989 | Johnson | 359/53 |
| 4,917,465 | 4/1990 | Conner et al. | 359/53 |
| 4,966,441 | 10/1990 | Conner et al. | 359/54 |
| 5,050,965 | 9/1991 | Conner et al. | 359/55 |
| 5,122,887 | 6/1992 | Mathenson | 359/53 |
| 5,124,818 | 6/1992 | Conner et al. | 359/53 |

*Primary Examiner*—William L. Sikes
*Assistant Examiner*—Kenneth Parker
*Attorney, Agent, or Firm*—Gray Cary Ware & Freidenrich

[57] ABSTRACT

A liquid crystal display device and method for generating the three primary colors and combinations thereof including black and white is disclosed using, at most, two adjacent discrete subpixels which together form a full color pixel. At least one dual STN cell system is included in each device, such controlled by EXCLUSIVE OR (XOR) logic.

40 Claims, 9 Drawing Sheets

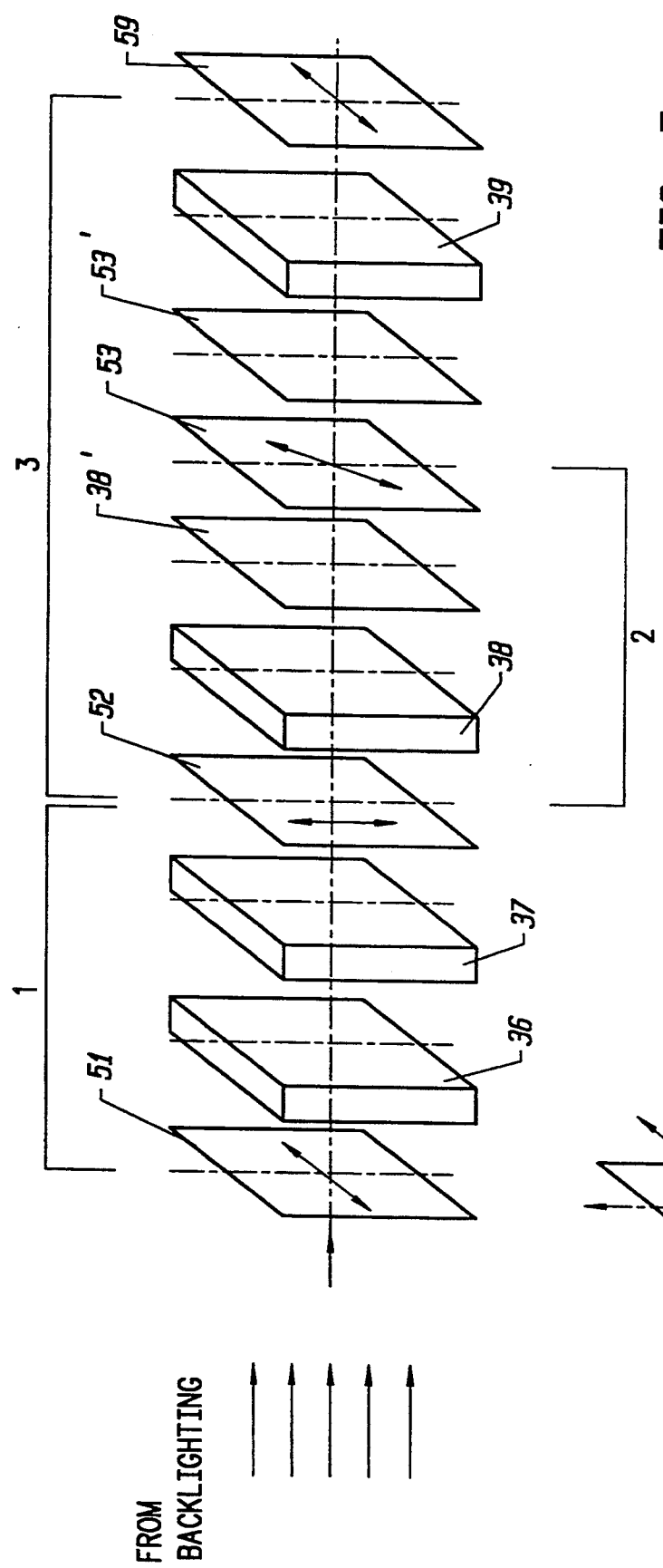

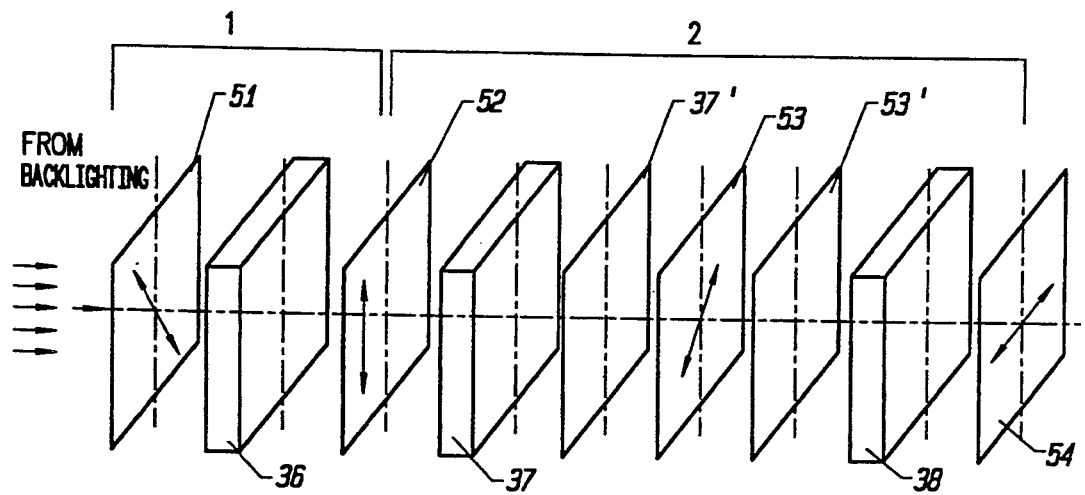
*FIG. 8A*   *FIG. 8*
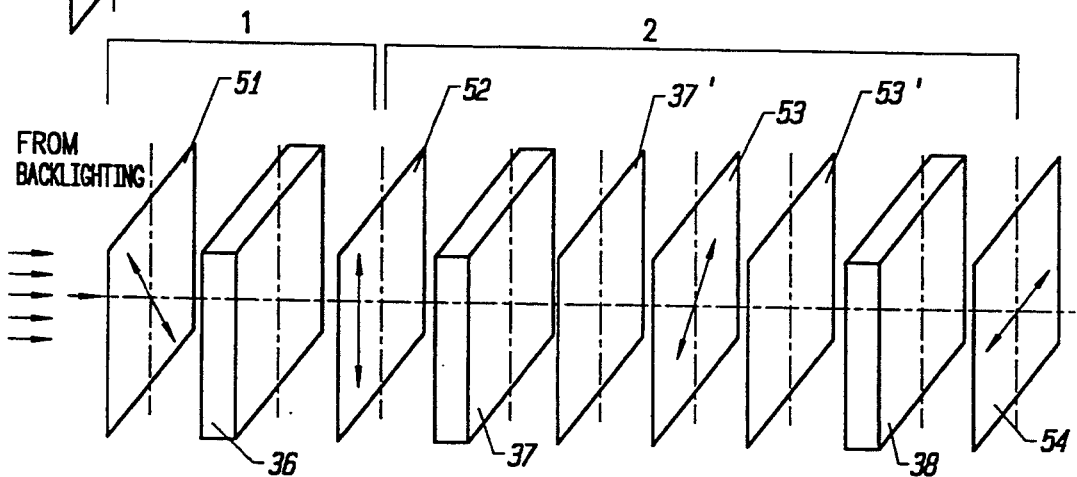
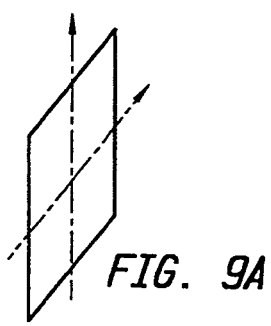
*FIG. 9A*   *FIG. 9*

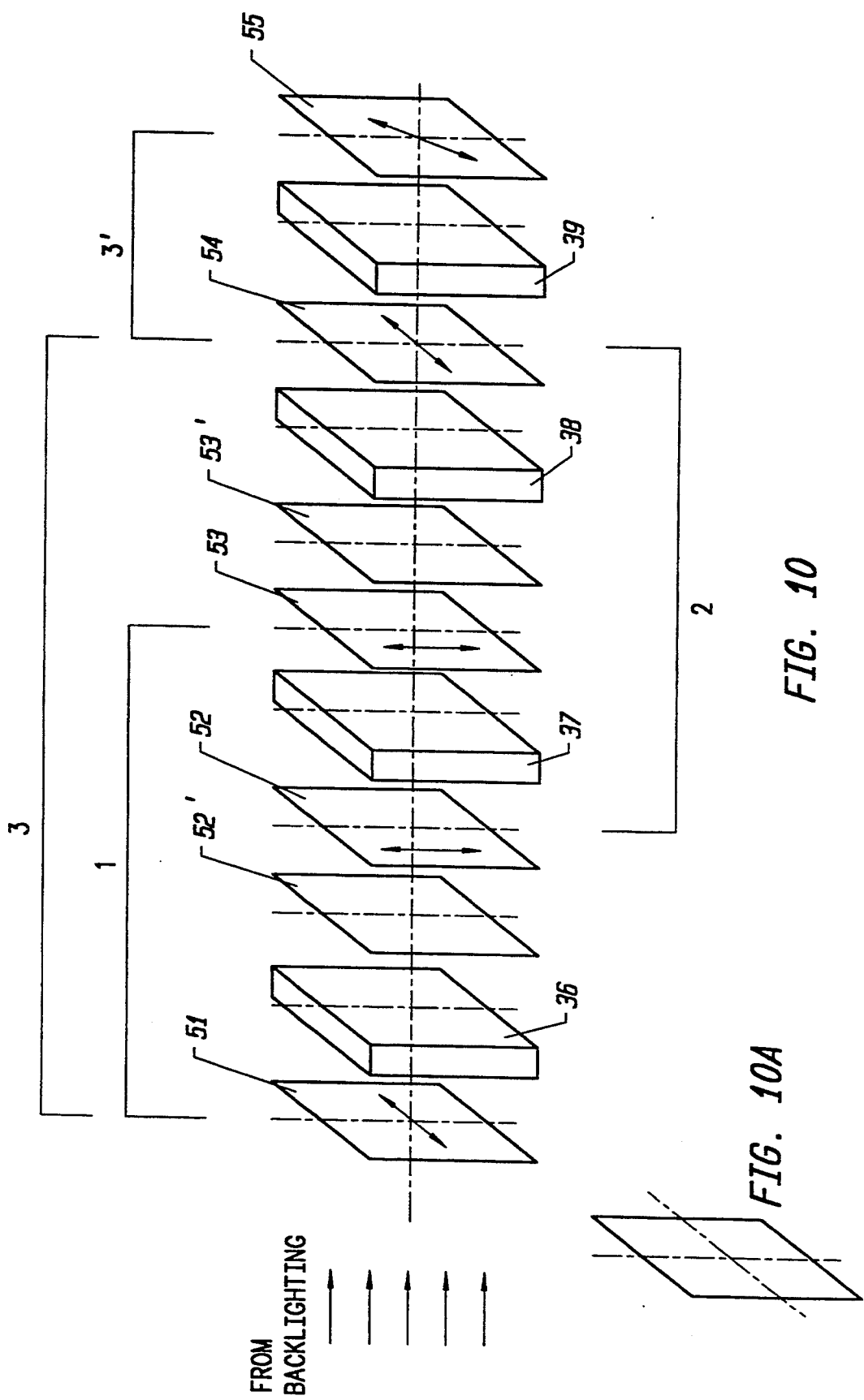

COLOR LIQUID CRYSTAL DISPLAY EMPLOYING DUAL CELLS DRIVEN WITH AN EXCLUSIVE OR RELATIONSHIP

FIELD OF THE INVENTION

This invention relates to liquid crystal display pixel arrangements, and more specifically to STN cell arrangements for generating the three primary colors in different combinations and black and white using compensation technology.

BACKGROUND OF THE INVENTION

For use in small portable televisions or laptop computer displays, both monochrome and color liquid crystal displays (LCDs) have become popular. LCD panels have many significant advantages over light emitting diode (LED) displays and cathode ray tubes (CRTs). For example, because LCD panels have very low power dissipation, they are useful for battery-operated equipment. Moveover, because of LCDs' high ambient light levels, they are in utilized in equipment for use outdoors. Also, for displays that require custom shapes and symbols or displays with many digits or characters, LCD's high pixel density is preferred over the low pixel density of LEDs. Because LCDs are compact in size, energy efficient, and have the potential 1or high performance, LCDs are considered very promising.

A significant limitation of twisted nematic LCD displays is the relatively long switching time and resultant limitation on driver multiplexing due to the physical nature of the LCD phenomenon. Therefore, although acceptable for displays with modest information content and interactivity, available twisted nematic LCDs are not yet competitive with CRTs requiring high information content and interactivity. To overcome the multiplexing problems, a transistor driver can be provided for each pixel, however, this solution is accompanied by a substantial increase in display complexity and cost.

Color LCDs are available, however, because they suffer even more than their monochrome counterparts from complexity and slow switching time, the technology is not competitive with color CRTs except where low power and thin-form factor is critical.

Super twisted nematic (STN) LCDs have become popular in many applications because their multiplexibility is superior to other types of liquid crystals. STN cells exhibit bi-stable behavior when they switch rapidly from a deselect state to a select state and back again as the excitation root mean square (RMS) voltage crosses a switch threshold. The select and non-select regions can be made quite close to one another and permit cells to be multiplexed at high rates. The use of STN cells with their superior multiplexibility avoids panel complexity because each cell does not need its own transistor driver.

While a benefit of STN cells is their high multiplexibility, their detriment is that they are optically anisotropic crystals having two indices of refraction and therefore they exhibit undesirable birefringence effects. Their double refractance makes them unsuitable, particularly for black and white LCD panel applications because the STN cell unavoidably produces colors. An STN cell polarizes light of different wavelengths differently during their passage through the cell, and as a result an STN cell cannot be operated in black or white with a high contrast ratio. Moreover, the colors produced by birefringence are regarded as too limited in range and too inferior in quality to be suitable for use in color displays.

The birefringence operating mode of STN cells, however, has been exploited by different arrangements. For example, since the degree of the birefringence is a function of the voltage applied to the liquid crystal material, by switching the applied voltage to different values, different colors can be produced by a properly configuring of the STN cells. For example, by utilizing this inherent birefringence property, an arrangement is shown in U.S. Pat. No. 4,917,465 where STN cells are stacked to form a plurality of tri-pixels tuned to generate different subtractive primary colors (i.e. yellow, cyan, and magenta).

In a modification of the tri-subpixel stacked LCD configuration, U.S. Pat. No. 4,966,441 shows a bi-subpixel system which allows the second panel to have twice as many pixels as the first. In the bi-subpixel arrangements, the colors are generated by both birefringent color and color filters. In principle, all eight basic colors can be generated with these approaches, however, because black and white transmission is poor, they both suffer from low contrast ratios. In an optimized configuration of that shown in U.S. Pat. No. 4,966,441, only about 25% of the light transmits through the cell at the select state and when the cell is in the non-select state, and is therefore turned off, about 5% of the light still passes through the cell, therefore reducing its transmissivity characteristics.

Another common approach to achieve color display with STN panel uses adjacent tri-pixels covered with mosaic color filters. Tri-subpixels are usually placed in a "parallel" or side-by-side way as compared to the stacked configuration where the tri-subpixels are placed in "series" or coaxially. In order to compensate for the color dependence of the birefringent effect, a compensation panel or a retardation film is needed in the tri-pixel color mosaic arrangement so that it can display black and white color. When the double layer supertwisted display (DSTN) configuration is used, one of the cells is passive and usually has no electrodes. LCD with the mosaic color filter tri-pixel configuration usually has a relatively low light transmissivity as compared to the stacked cell configuration.

SUMMARY OF THE INVENTION

In order to overcome the problem of the prior art as described above, a method and device to improve the contrast ratio of liquid crystal display in the stacked configuration with the incorporation of compensation technology is disclosed herein. The conventional stacked STN LCD technology uses birefringence color. However, the principal of birefringence color, which changes the transmissivity of light of one primary color by switching the state of a particular LCD panel without changing the transmissivity of light of the other two primary colors, conflicts with the principal of compensation technology which eliminates the light wavelength dependence of the transmissivity in both the select and the non-select states.

In the present invention, each pixel generates the three primary colors which are each controlled by separate optical assemblies. In optically subtractive and additive combinations, the three secondary colors plus black and white are generated with a high contrast ratio, a high resolution and high transmissivity using highly multiplexible STN cells.

The present invention uses STN cells for their high multiplexibility but avoids their birefringence effects. In each optical assembly (OA) arrangement, light of a primary color is linearly polarized before it passes through a first STN cell where it is elliptically polarized, and then by passing the light through another STN cell or a retardation film, the light is restored to its linear polarization. In doing so, the present invention provides mirror symmetry for the polarization state of light originally linearly polarized. Because light can be made linearly polarized upon exiting the compensating STN cell or retardation film, it can be completely blocked by an exit polarizer. By nearly complete blockage, a high contrast ratio is achieved. Unlike the prior art of the DSTN configuration when one of the LCD cells is used only passively, in many embodiments of the present invention, both cells in a compensating pair are used actively in the operation that generates all eight basic colors.

In accordance with the present invention, two, three or four LED cells form an ordered arrangement. In various embodiments, compensation is provided by as many as three dual STN cell systems. In other embodiments, fewer dual STN cell systems are arranged, with single STN cells capable of being coupled with retardation films. In all embodiments, exit polarizers block restored linearly polarized light so that a high contrast ratio is achieved.

As indicated above, the STN cells can be in either a non-select state or select state. These states can be equated with the binary numbers, zero and one and therefore color can be defined in terms of binary logic, that is, any particular color can be identified as a specific binary combination (herein after also referred to as B/C) of select and non-select states. For example, in the case of an overall arrangement containing four cells, when all of the cells are in non-selected states, the binary number equivalent of their combined states is zero (0000) and a color, such as black is associated with the binary number zero (of course, depending on the arrangement). On the other hand, when a first cell is in the non-select state and the other three cells are in a selected state, the binary number equivalent of their combined states is seven (0111), and a different color, such as cyan is associated with that number (again, depending on the arrangement).

Here, the logic that governs a particular color by using a pair of compensating cells is the "EXCLUSIVE OR" (XOR). Light of this particular color passes through the invented display device if and only if the two liquid crystal display panels in this pair are in different states; with one panel in the select state while the other one is in the non-select state.

The present invention uses STN cells for their high multiplexibility but avoids their bireference effects. In embodiments disclosed here, one or more pairs of compensating supertwisted nematic liquid crystal display panels are stacked to generate colored display with high contrast ratio. In a compensating pair, the two liquid crystal display panels are similarly constructed but with their liquid crystal molecules twisted in the opposite sense. The linearly polarized light passing through the first STN layer becomes elliptically polarized with an ellipticity and principal axis direction strongly wavelength dependent. However, whatever the first STN layer does to the light, the second, compensating layer undoes and restores the linear polarized state so that the light can be completely absorbed by an exit polarizer. By being able to nearly completely block the transmission of light, a high contrast ratio is achieved.

BRIEF DESCRIPTION OF THE DRAWINGS

FIG. 7 shows a seventh embodiment of the present invention having a single pixel arrangement wherein three optical assemblies are linearly arranged within the single pixel arrangement;

FIG. 7A shows a polarizer orientation guide for the polarizers of FIG. 7;

FIG. 8 shows an eighth embodiment of the present invention having a single pixel arrangement wherein three optical assemblies are linearly arranged within the single pixel arrangement;

FIG. 8A shows a polarizer orientation guide for the polarizers of FIG. 8;

FIG. 9 shows a ninth embodiment of the present invention having a single pixel arrangement wherein three optical assemblies are linearly arranged within the single pixel arrangement;

FIG. 9A shows a polarizer orientation guide for the polarizers of FIG. 9;

FIG. 10 shows a tenth embodiment of the present invention having a single pixel arrangement wherein three optical assemblies are linearly arranged within the single pixel arrangement;

FIG. 10A shows a polarizer orientation guide for the polarizers of FIG. 10;

DETAILED DESCRIPTION OF THE INVENTION

The complete or nearly complete block of light of all wavelengths in the "black" state is required to achieve a high contrast ratio. The display of black requires that light of all wavelengths be linearly cross-polarized with the exit polarizer to effect complete light blockage. The display of white requires that all wavelengths of light has equal passage through the exit polarizer. Because of the way the present invention controls polarization of light before it passes through the exit polarizer, nearly complete blockage for black can be effected.

Figure 1:
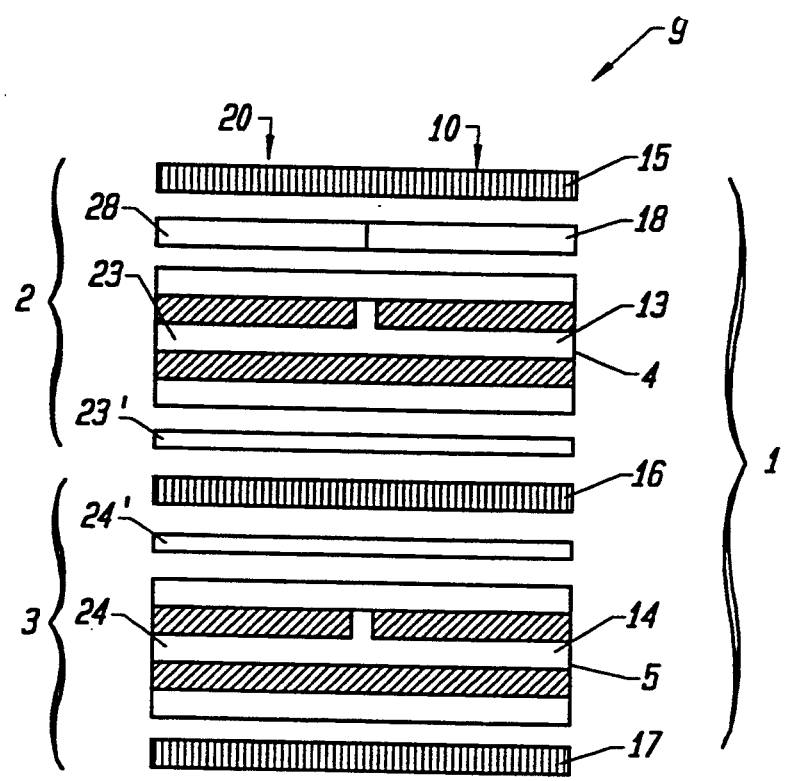
FIG. 1 shows a cross-section of a first embodiment of the present invention having two subpixel systems, wherein one optical assembly occupies one subpixel system, and two optical assemblies are linearly arranged and occupy a second subpixel system.

Turning to the first embodiment shown in FIG. 1, a single picture pixel arrangement 9, which is a full-color pixel, including two adjacent subpixel systems 10 and 20 is shown. In this arrangement, 1 dual compensating STN cell system is used for a first primary color. The other two primary colors are controlled by single STN cells coupled with retardation films. Subpixel system 10, on the right, includes a first optical assembly 1 for controlling a first primary color. The first optical assembly 1 includes a first STN LCD display cell 13 and a second STN LCD cell 14. Adjacent to subpixel 10 is subpixel 20 which includes two linearly aligned optical assemblies, 2 and 3 for controlling a second and third primary color, respectively. The second optical assembly 2 includes a third cell STN 23 and a retardation film 23'. The third optical assembly 3 includes a fourth cell 24 and a retardation film 24'.

In the embodiment shown in FIGS. 1–4, the cells 13 and 23, and 14 and 24, are individual cell pixels which are adjacent to one another on a common cell panel. In the manufacturing process, the cells are individual units or, alternatively, are cell pixels on a common cell panel, depending upon the materials used. Such configuration is shown in FIGS. 1–4. In either case, cells 13 and 23, and 14 and 24, operate electrically independently of one another. Hereinafter, cell pixels 13 and 23 of panel 4 and cell pixels 14 and 24 of cell panel 5 will be referred to as cells 13 and 23 and cells 14 and 24, although both types will be considered. In other words, cells 13 and 23 will be considered as part of panel 4, and 14 and 24 will be considered as part of panel 5 in this discussion.

The four cells are specifically arranged so that when they are their respective in zero/non-select states or in the one/select states and certain polarizers and/or color filters are positioned in series therewith, the four cells generate eight colors, including black and white, according to the following binary order:

TABLE 1

| OA 1 Cell 13 | OA 2 Cell 23 | OA 1 Cell 14 | OA 3 Cell 24 | Binary Number | Color |
| --- | --- | --- | --- | --- | --- |
| non-select | non-select | non-select | non-select | 0000 = 0 | blue |
| non-select | non-select | non-select | selected | 0001 = 1 | cyan |
| non-select | non-select | select | non-select | 0010 = 2 | magenta |
| non-select | non-select | select | select | 0011 = 3 | white |
| non-select | select | non-select | non-select | 0100 = 4 | black |
| non-select | select | non-select | select | 0101 = 5 | green |
| non-select | select | select | non-select | 0110 = 6 | red |
| non-select | select | select | select | 0111 = 7 | yellow |

Eight numbers, 0–7, are represented by the binary representation of the possible states of cells 13, 14, 23 and 24, except that in this arrangement, cell 13 always remains in the zero/off/non-select state. In other embodiments described below, all four cells operate both in the on and off states.

Cells 13 and 14 of optical assembly 1 have the same configuration except that cell 13 has its liquid crystal molecules twisted in the opposite direction as does cell 14. When both cells are in the same state, the second compensates the first. For example, when both cells are in the non-select state, the linearly polarized light beam passes cell 13 and becomes elliptically polarized with its principal axis direction strongly wavelength dependent, but as the light passes cell 14, the light is restored to being linearly polarized. Therefore, because the exit polarizer 17 is appropriately positioned, light is blocked by exit polarizer 17. However, when the two cells are in opposite states, the light is not blocked. (See Table 1, optical assembly 1, cells 13 and 14, for controlling red.)

In the example shown in FIG. 1, cells 23 and 24 of optical assemblies 2 and 3 are compensated by retardation films 23' and 24' respectively. The two retardation sheets have identical retardation values but the second retardation film 24' is rotated by 90 degrees with respect to the first retardation film 23' so that the slow axis of the first film 23' is parallel to the fast axis of the second film 24'.

As indicated above, the three primary colors controlled by the three individual optical assemblies are each chosen by the polarizers and/or filters which are strategically positioned as entrance elements to the optical assembly and as exit elements. The polarizers and/or filters can easily be arranged so that different primary colors are controlled by different optical assemblies than those described here. The particular arrangement of polarizers and/or filters described with regard to FIG. 1 is provided as an example.

On subpixel system 10, the entrance polarizer 15 is a green polarizer which polarizes blue and red light. The second polarizer 16 is a red polarizer which polarizes blue and green light. The exit polarizer 17 is a blue polarizer which polarizes green and red light. The entrance polarizer 15 and the exit polarizer 17 are positioned in a "cross" orientation to one and other. On subpixel system 10, between polarizer 15 and cell 13, is red filter 18 which blocks blue and green light. On subpixel system 20, cyan (blue and green) filter 28 blocks red light. These polarizers and/or filters are selected so that the first optical assembly 1 controls red, the second optical assembly 2 controls blue and the third optical assembly 3 controls green. As mentioned above, by additive and subtractive optics, the three secondary colors and black and white are generated by the combination of red, blue and green.

The following description outlines how the primary colors, red for optical assembly 1, blue for optical assembly 2 and green for optical assembly 3 are generated according to the first embodiment of the present invention shown in FIG. 1. As described above, red color filter 18 allows the red polarized light to pass through the first STN cell 13. The red light therefore becomes elliptically polarized. The red light then passes through red polarizer 15 without any change. Red polarizer 15 operates in conjunction with subpixel system 20, but it only polarizes green and blue light. Moreover, the two retardation films 23' and 24' can be considered optically isotropic for on-axis light and therefore can be ignored for operation in subpixel system 10. Thus, the STN cell 13 elliptically polarized red light which then passes through the second STN cell 14.

As shown in Table 1, red light cannot be transmitted through the full color pixel 9, if cells 13 and 14 are in the same states since LCD panels 4 and 5 form a compensating pair. However, when the cell 14 is in the select state while pixel 13 is kept in the non-select state (cell 13 may be kept always in the non-select state), the compensation effect does not apply and the red light which passes through cell 14 will not be restored to its original polarization state. It will therefore not be totally absorbed by the exit polarizer 17 and will become visible to an observer. As a result, red light can transmit through the full color display pixel 9 only if cell 13 in panel 4 and cell 14 in panel 5 are in different states, and a high contrast in red light can be achieved.

Blue light is controlled by optical assembly 2 on subpixel system 20 and is transmitting when cell 23 is in the off state (see Table 1). Cyan (blue and green) filter 28 blocks red light and allows transmission of blue and green light. Blue light which has been polarized by green entrance polarizer 15, will pass through panel 4 and become elliptically polarized. The light then passes retardation film 23' which provides reasonable compensation for the panel 4 for blue light in the non-select state. The red polarizer 16, which polarizes blue and green light and acts as the exit polarizer for optical assembly 2, is arranged to permit the transmission of polarized blue light when cell 23 in panel 4 is in the off/non-select state and block it when the cell 23 is in the on/select state.

Finally, green light is controlled by third optical assembly 3 on subpixel system 20 and is polarized by red polarizer 16 (which also acts as the exit polarizer for optical assembly 2). The green light is unaffected by cell 23 and the first retardation film 23' because the green light is unpolarized until it passes red polarizer 16. The green polarized light first passes the retardation film 24' and then STN cell 24. Because there is mirror symmetry about the center of the optical assembly 2 - optical assembly 3 system with respect to the polarized state of blue and green light, the green polarized light will pass through the retardation film 24' and then the STN cell 24 just like a polarized beam is reflected by a mirror located by the red polarizer 16, back through retardation film 23' and cell 24 in panel 4. Transmitting of green light is therefore controlled by the optical assembly 3 in a way exactly like the control of blue light's transmission by the optical assembly 2.

Polarizers 15 and 17 are only used to create and detect the polarization state of the light. Since polarizers 15 and 17 are positioned in a "cross" orientation, the logic of the two STN cells, 23 and 24, respectively responsible for the passage of blue and green light, is opposite. That is, if the select state for green light provides maximum transmission, the select state for the blue light provides minimum transmission. Note that STN cell 24 and polarizer 17 do not affect the display of blue light, and that it is irrelevant what effect cell 24 has on the blue light. Blue exit polarizer 17 only polarizes red and green, and therefore it does not block polarized blue light. It simply passes through the polarizer 17 and is viewed by an observer of the display.

As noted above, the particular arrangement of polarizers and/or filters described with regard to FIG. 1 has been provided as an example. The polarizers and/or filters can easily be arranged so that different primary colors are controlled by different optical assemblies than those shown in FIG. 1. For example, a blue polarizer can replace polarizer 15, a green polarizer can replace polarizer 16, and a red polarizer can replace polarizer 17. In accordance with the present invention, the choice as to which configuration to use depends on the availability of color filters and polarizers as well as the tune of the display picture that best fits the particular need. The function of select and non-select states of the two colors displayed by optical assemblies 23 and 24 can be interchanged as well. Three versions with interchanged polarizers is summarized in Table 2.

TABLE 2

| ELEMENTS | VERSION | | |
|---|---|---|---|
| | 1st | 2nd | 3rd |
| 1st polarizer | blue | green | red |
| 2nd polarizer | red or green | blue or red | green or blue |
| 3rd polarizer | green or red | red or blue | blue or green |
| color filters | red  cyan | blue  yellow | green  magenta |

Figure 2:
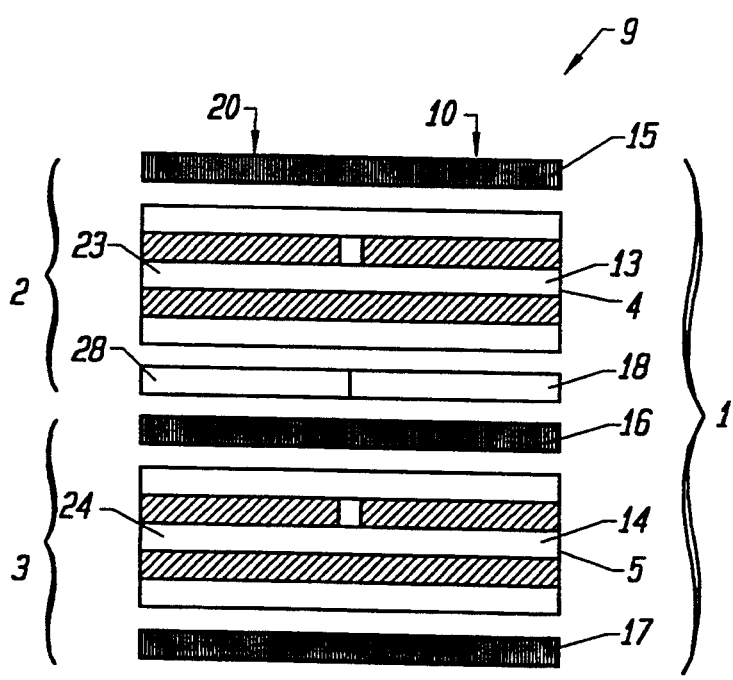
FIG. 2 shows a cross-section of a second embodiment similar to that of FIG. 1 wherein the optical cooperating components are rearranged.

Also, in the embodiment shown in FIG. 1, the color filter 18/28 can be positioned differently. For example, FIG. 2 shows the color filter 18/28 positioned between panel 4 and polarizer 16. In this example, the retardation films are not shown. The configuration shown in FIG. 2 may be desired because when the color filter 18/28 is so positioned, parallax is minimized. A parallax effect is mainly caused by the separation of two stacked cells and the color filters. However, if a backlighting system with a sufficiently high degree of collimation is employed, parallax is less of a problem and therefore the location of the color filter is not important.

Figure 3:
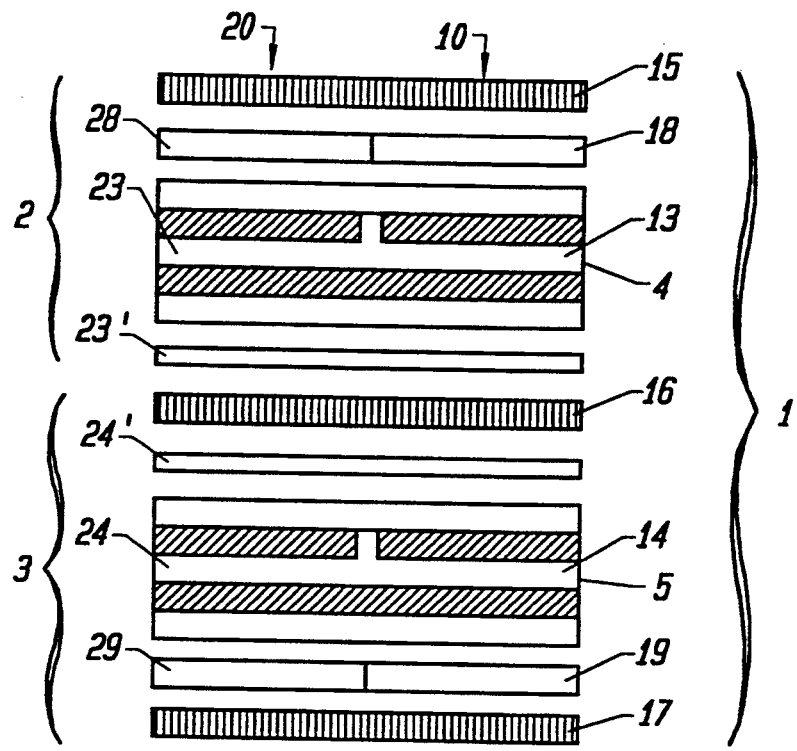
FIG. 3 shows a cross-section of a third embodiment of the present invention similar to that of FIGS. 1 and 2 however the cooperating optical components are rearranged.

An arrangement including additional filters is shown in FIG. 3. In addition to adjacent filters 18 and 28, adjacent filters 19 and 29 are positioned between panel 5 and polarizer 17. As indicated above, red filter 18 allows the red polarized light to pass and cyan filter 28 allows blue and green light to pass. In this arrangement, adjacent filters 19 and 29 are linearly aligned with adjacent filters 18 and 28 and are of the same type. Accordingly, in the event of insufficient backlighting collimation or scattering inside the assembly, color leakage can be avoided. Moreover, color saturation can be improved. Also, this arrangement provides a less expensive manufacturing process than others disclosed herein. The color filter dye used for manufacturing color LCDs is expensive and its processing is complicated since in the traditional configuration the color filter is deposited between the glass sheet and the transparent electrode and must withstand a temperature as high as 250 degrees C. during other manufacturing processes. By placing the color filter outside the liquid crystal cell, conventional dyes can be used to manufacture color filter layers and the cost of color filters is decreased significantly. Such color filters can be created either by printing dyes on to the surface of a liquid crystal cell or by depositing the dye on to a separated thin plastic sheet.

In the arrangement shown in FIGS. 1–3, for controlling one primary color, optical assembly 1 has dual cells for compensation. However, for the other two optical assemblies 2 and 3, for compensation, STN cells are paired with retardation films. In this arrangement, there may also be undesirable retardation effects caused by color polarizers. For example, while a red polarizer polarizes blue and green light, it has a retardation effect on red light if the red polarizer is made of stretched dyed plastic film.

In the above discussion, ideal color polarizers which do not affect the polarization state of light are assumed. However, in reality, a color polarizer may affect, in a retarding manner, the polarization state of colored light which is not specifically polarized by the color polarizer. The color polarizer may also act as a retardation plate to colors which it does not specifically polarize and are meant to simply pass through unchanged. This is because polarizers made by stretching a plastic film dyed with a particular color will have its molecules in the plastic film aligned in the stretching direction and make the film anisotropic. Light, which is not polarized by this color filter may nevertheless have its polarization state changed by the polarizer since light polarized along and perpendicular to the aligned direction of the molecule will experience a different optical path when propagating the film. For this reason, it is sometimes necessary to use an additional retardation film, positioned properly, to compensate the retardation effect of some color polarizers.

Figure 4:
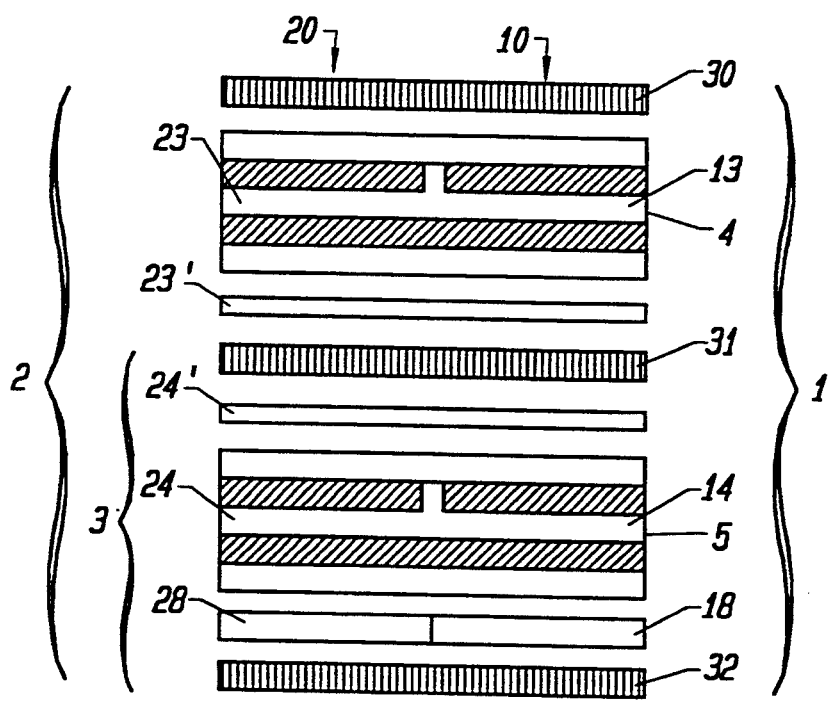
FIG. 4 shows a cross-section of a fourth embodiment of the present invention having three optical assemblies, wherein one subpixel system occupies one subpixel system, and two optical assemblies are linearly arranged and occupy an adjacent second subpixel system.

A different configuration is shown in FIG. 4, which enhances the attribute of the present invention, adding better compensation by using a second, dual compensating STN system and by using gray polarizers in place of color polarizers. FIG. 4 shows the use of two gray polarizers and a yellow polarizer which are chosen to reduce the use of retardation film, and therefore enhance compensation while including two dual STN systems. In some situations, it is preferable to use the configuration of FIG. 4 over that of FIGS. 1-3.

Turning to FIG. 4, subpixel system 10 uses the dual STN cell system of optical assembly 1 to control red in the manner described above with reference to FIG. 1. However, in this embodiment, on subpixel system 20, green is also controlled in a symmetrical manner by a dual STN cell system. By addition of gray entrance polarizer 30 and exit polarizer 32, which polarize light of all colors, and the addition of yellow polarizer 31 which cooperates with retardation films 23' and 24', compensation mirror symmetry for optical assembly 2 is provided for yellow light. Therefore, for controlling green, a dual STN cell system includes cell 23 compensated by cell 24. Blue is controlled by optical assembly 3 including just cell 24 and retardation film 24' as it was in FIG. 1. The arrangement shown in FIG. 4 provides the logic between color and switching state as follows:

TABLE 3

| OA 1<br>Cell 13 | OA 2<br>Cell 23 | OA 1<br>Cell 14 | OA 2<br>and 3<br>Cell 24 | Binary Number<br>and Color |
| --- | --- | --- | --- | --- |
| non-select | non-select | non-select | non-select | = zero or black |
| non-select | non-select | non-select | select | = one or cyan |
| non-select | non-select | select | non-select | = two or red |
| non-select | non-select | select | select | = three or white |
| non-select | select | non-select | non-select | = four or green |
| non-select | select | non-select | select | = five or blue |
| non-select | select | select | non-select | = six or yellow |
| non-select | select | select | select | = seven or magenta |

Eight numbers, 0-7, are represented by the binary representation of the possible states of cells 13, 14, 23 and 24, except that here as in Table 1, cell 13 remains in the zero/off/non-select state. Note that with regard to cells 14, 23 and 24, to generate red and blue, the logic has an opposite configuration.

In this arrangement, the entrance 30 and exit polarizers 32 are grey polarizers which polarize all colors. By suitably arranging the yellow polarizer 31 and the retardation films 23' and 24', blue light is controlled by optical assembly 2 and the transmission of blue can be blocked when cells 23 and 24 are in the off/non-select state, thus improving the contrast ratio.

The yellow polarizer 31 is sandwiched between LCD panels 4 and 5. While it polarizes only blue light, it however has a retardation effect on light of other colors (green and red). Retardation film 23' and 24' are on either side of yellow polarizer 35. On the one hand, retardation films 23' and 24' compensate the retardation effect of the yellow polarizer 35 so that red and green light can pass without much change in their polarization state. On the other hand, the retardation film, together with the yellow polarizer, break the symmetry of optical assemblies 2 and 3 for blue light so that the transmission of blue light can be controlled only by one of the optical assemblies, optical assembly 3 in the current arrangement, with properly chosen retardation films.

Other embodiments of the present invention include linear configurations such as those shown in FIGS. 5-10. In each of these examples, the optical assemblies, each for controlling a primary color, are linearly aligned. Therefore, the surface area of the display occupied by one pixel, is equivalent to only one optical assembly. Accordingly, the resolution of the display can be maximized for a given screen area.

Figure 5:
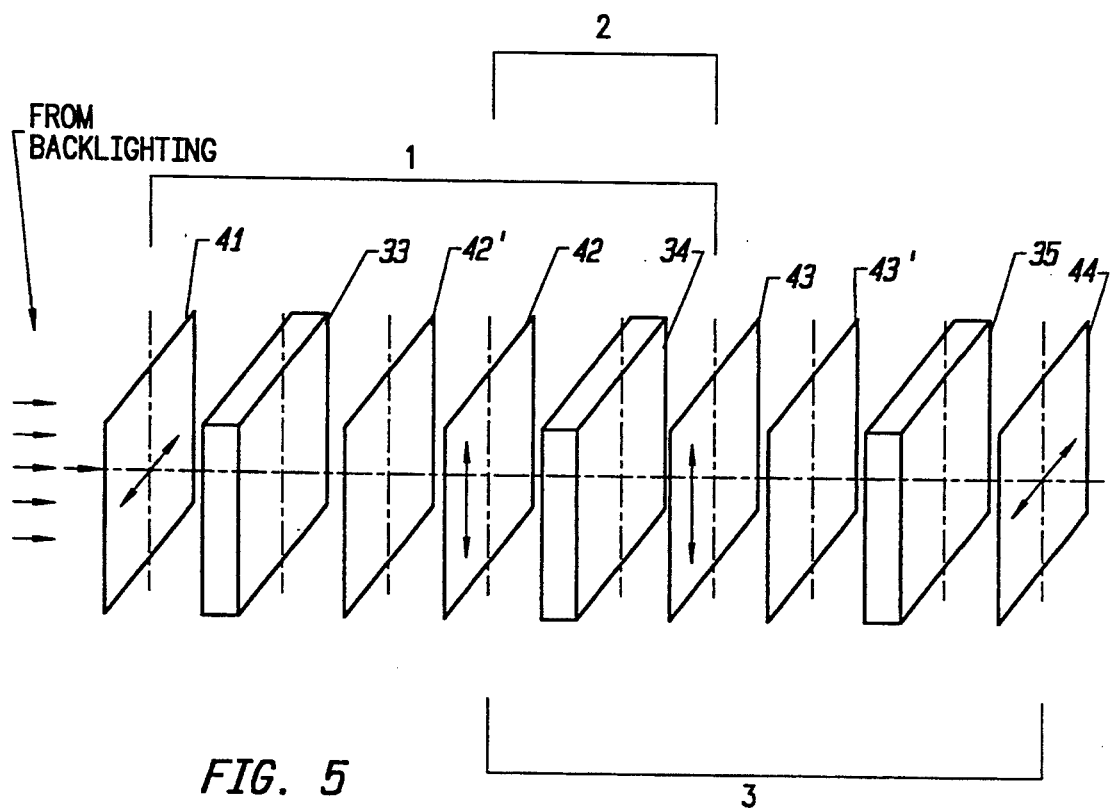
FIG. 5 shows a fifth embodiment of the present invention having a single pixel arrangement wherein three optical assemblies are linearly arranged within the single pixel arrangement.
Figure 5A:
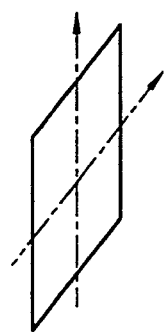
FIG. 5A shows a polarizer orientation guide for the polarizers of FIG. 5.

FIG. 5 shows a first linearly aligned embodiment wherein three cells are used. The first cell 33 and the third cell 35 have their liquid crystal molecules twisted in identical directions and are also identically constructed. The second cell 34 is constructed similarly to cell 33 and 35, but has its liquid crystal molecules twisted in the opposite direction. The three cells are arranged and ordered in such a way that: cells 33 and 34 form a compensating pair while cells 34 and 35 form another compensating pair. In this arrangement, cells 33 and 34 form the first optical assembly which follows the logic of "XOR" for its operation. Similarly, the third optical assembly which is composed of cells 34 and 35 also follows the logic of XOR for its operation. The optical assembly 2 contains only one cell, 34. With the polarizers and the liquid crystal display cells arranged as shown in FIG. 5, all eight colors, including black and white, can be generated according to the following binary order:

The three cells are ordered so that when they are in the on/select state or in the off/non-select state and certain color polarizers are appropriately positioned, the three cells generate eight colors, including black and white according to the following binary order:

TABLE 4

| Optical Assembly 1 | Optical Assembly 2 | Optical Assembly 3 | Binary Number |
| --- | --- | --- | --- |
| Cell 33 | Cell 34 | Cell 35 | and Color |
| non-select | non-select | non-select | zero = black |
| non-select | non-select | select | one = green |
| non-select | select | non-select | two = white |

TABLE 4-continued

| Optical Assembly 1 | | | |
| --- | --- | --- | --- |
| | Optical Assembly 2 | | |
| | | Optical Assembly 3 | Binary Number |
| Cell 33 | Cell 34 | Cell 35 | and Color |
| non-select | select | select | three = magenta |
| select | non-select | non-select | four = red |
| select | non-select | select | five = yellow |
| select | select | non-select | six = cyan |
| select | select | select | seven = blue |

According to this arrangement, the transmission of red light is controlled by switching cell 33 and the transmission of green light is controlled by switching cell 35. The transmission of blue light is principally controlled by switching cell 34. Optical assembly 1 include cells 33 and 34, optical assembly 2 includes cell 34 and a retardation film 43' and optical assembly 3 includes cells 34 and 35.

The high contrast for red and green is secured by the mirror symmetrical construction of optical assemblies 1 and 3 when they are operated in a state to block light from transmitting. Optimization of the optical assembly 2, which contains only one cell (cell 34), can be achieved by using compensators. Suitable retardation films 42' and 43' are needed to be placed next to polarizers 42 and 43 to compensate the retardation effects of the color polarizers if the polarizers, 42 and 43, are made of dyed stretched film. with this approach, a display of high contrast can be constructed without color filters.

Light from the backlighting, first passes through a cyan entrance polarizer 41 which polarizes red light. Green polarizer 43, which polarizes red and blue acts, as an exit polarizer for optical assembly 1. Polarizer 41 and polarizer 43 are cross-aligned. Therefore, when cell 33 and cell 34 are in the same states, the linear polarization of the red light is restored and is blocked by green polarizer 43. When cell 33 and cell 34 are in different states, polarizer 43 permits the red light to pass.

Similarly, red polarizer 42 which polarizes blue and green, is the entrance polarizer for optical assembly 3 which controls the transmission of green light. If both cell 34 and cell 35 are in the same state, then the linearly polarized green light is blocked by magenta exit polarizer 44, which polarizes green light and is cross aligned with polarizer 42. When cell 34 is in the non-select state and cell 35 is in the select state, magenta polarizer 44 permits the green light to pass. Therefore, green light is transmitted.

Red polarizer 42 which polarizes blue and green, is the entrance polarizer for optical assembly 2 which controls the transmission of blue light. By switching all three cells to the select state, the transmission of pure blue can be obtained because red and green can be blocked owing to their mirror symmetry.

Figure 6:
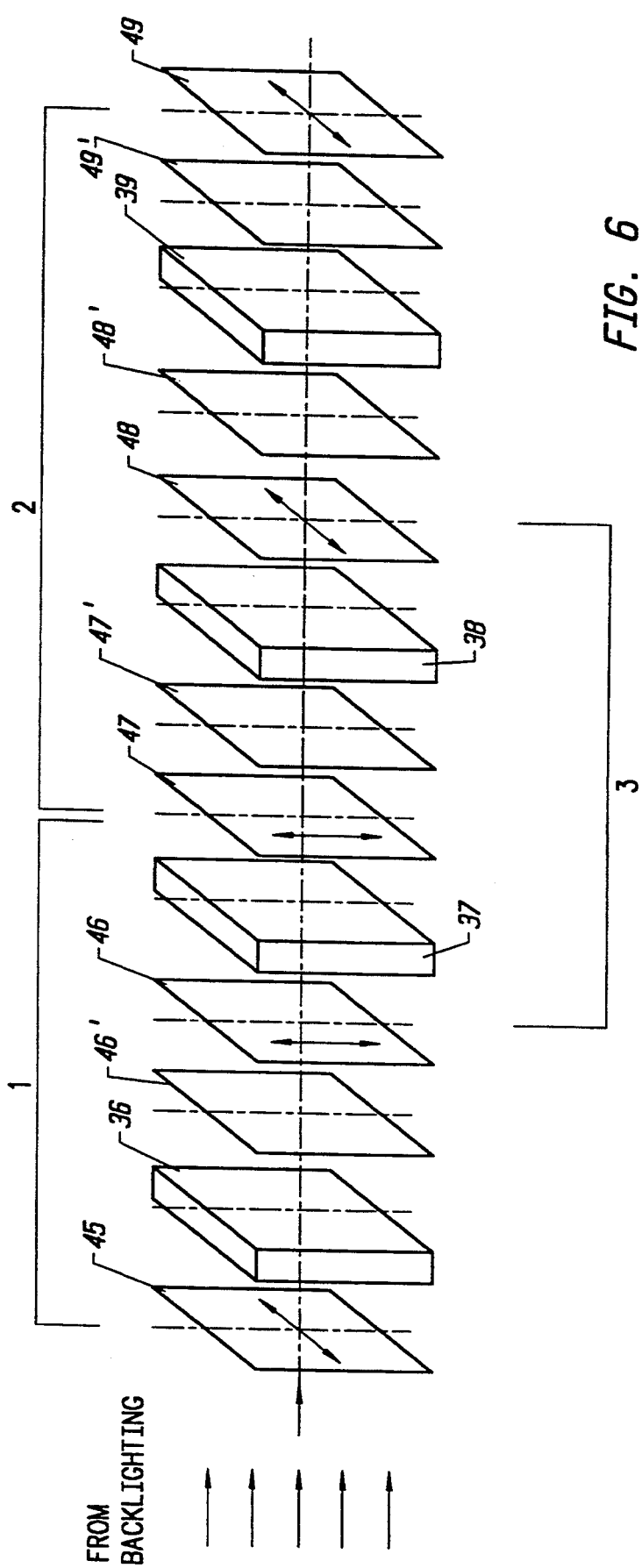
FIG. 6 shows a sixth embodiment of the present invention having a single pixel arrangement wherein three optical assemblies are linearly arranged within the single pixel arrangement.

Another linear arrangement of the present invention is shown in FIG. 6, such provided without the use of color filters. Optical assemblies 1, 2, and 3 are aligned and include four STN cells, 36, 37, 38 and 39 which are shared by neighboring optical assemblies so that three dual STN cell systems are formed. In other words, in this arrangement, each optical assembly overlaps with another neighboring optical assembly because they share an STN cell. Optical assembly 1 for controlling a first primary color includes cells 36 and 37 in a dual STN cell system. Optical assembly 2 for controlling a second primary color includes cells 38 and 39. Optical assembly 3 for controlling a third primary color includes cell 37 in a shared arrangement with optical assembly 1 and includes cell 38 in a shared arrangement with optical assembly 2.

Figure 6A:
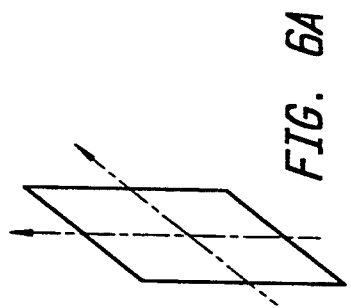
FIG. 6A shows a polarizer orientation guide for the polarizers of FIG. 6.

Cells 36 and 38 have their liquid crystal molecules twisted in identical directions while cells 37 and 39 have their liquid crystal molecules twisted in the opposite direction of cells 36 and 38. By appropriately positioning and cross-orienting color polarizers 45, 46, 47, 48 and 49, the cell pairs of optical assemblies 1, 2 and 3 compensate one another. For example, FIG. 6A depicts the cartesian orientation for polarizers in FIG. 6 where the arrow indicates that particular polarizer's orientation direction. Retardation films 46', 47', 48' compensate polarizers 46, 47, 48 as discussed with reference to FIG. 4. Retardation film 49' operates to keep the mirror symmetry of optical assembly 2. In this example, polarizer 45 is a yellow polarizer (polarizing blue light), 46 is a magenta polarizer (polarizing green light), 47 is a green polarizer (polarizing red and blue light), 48 is magenta polarizer (polarizing green light) and 49 is a cyan polarizer (polarizing red light).

Turning to Table 5, the four cells operate with binary symmetry to generate each primary and secondary color and black and white. Note in Table 5 (and Table 6 below) that there are two possible switching combinations for each of the eight basic colors. The arrangement shown in FIG. 5 provides the logic between color and switching state as follows:

TABLE 5

| Optical Assembly 1 | | | | |
| --- | --- | --- | --- | --- |
| | | Optical Assembly 2 | | Binary Number |
| | | Optical Assembly 3 | | or Color |
| Cell 36 | Cell 37 | Cell 38 | Cell 39 | Color |
| non-selected | non-selected | non-selected | non-selected | = zero or black |
| non-selected | non-selected | non-selected | select | = one or red |
| non-selected | non-selected | select | non-selected | = two or yellow |
| non-selected | non-selected | select | select | = three or green |
| non-selected | select | non-selected | non-selected | = four or cyan |
| non-selected | select | non-selected | select | = five or white |
| non-selected | select | select | non-selected | = six or magenta |
| non-selected | select | select | select | = seven or blue |
| select | non-selected | non-selected | non-selected | = eight or blue |
| select | non-selected | non-selected | select | = nine or magenta |
| select | non-selected | select | non-selected | = ten or white |
| select | non-selected | select | select | = eleven or cyan |
| select | select | non-selected | non-selected | = twelve or green |
| select | select | non-selected | select | = thirteen or yellow |
| select | select | select | non-selected | = fourteen or red |
| select | select | select | select | = fifteen or black |

As indicated above, each optical assembly has an entrance polarizer and an exit polarizer and in some cases they are within the confines of a neighboring optical assembly. For example, magenta polarizer 46, which is the entrance polarizer optical assembly 3, is present within the confines of optical assembly 1. However, polarizer 46 does not affect the blue light because a magenta polarizer only polarizes green light. Therefore, while cell 37 is shared, magenta polarizer 46 does not impact optical assembly 1.

In the example shown in FIG. 6, optical assembly 1 controls blue, optical assembly 2 controls red and optical assembly 3 controls green. Each dual STN compensation system includes an entrance polarizer and an exit polarizer appropriately chosen so that each optical assembly controls a primary color. For example, yellow entrance polarizer 45 polarizes blue light, which acted upon by the dual STN compensation system. If cell 45 and cell 46 are in different states, the linearity of the blue polarizes light has not been restored and therefore green exit polarizer 47 which polarizes blue and red light allows transmission of the non-linearly polarized blue light. If cells 45 and 46 are in the same state, exit polarizer 47 blocks transmission of blue light. In optical assembly 2, red light is blocked when cells 38 and 39 are in the same state, and in optical assembly 3, green light is blocked when cells 37 and 38 are in the same state. Each primary color is transmitted when the dual STN systems have cells in different states.

In this embodiment, black is generated when all four cells are in the same state. Light of one color will pass through the assembly when the mirror symmetry of one optical assembly is broken. For example, if cell 36 is switched to a select state and all the other cells are in the non-select state, cells 36 and 37 cannot compensate each other and blue light can pass through the display assembly. Furthermore, if the symmetry of two optical assemblies is broken, two colors will pass through the assembly. For example, cyan light is transmitted when optical assemblies 1 and 3 have broken symmetries and yellow light is transmitted when optical assemblies 2 and 3 have broken symmetries. Finally, white is generated when the symmetries of all three optical assemblies are broken. In each optical assembly in this embodiment, transmitting of light of all three primary colors follows the logic of XOR.

Another linear arrangement of the present invention is shown in FIG. 7, such provided without the use of color filters and with the use of fewer components than the arrangement shown in FIG. 6. In this arrangement, a gray polarizer 37 acts as exit polarizer for optical assembly 1 and as entrance polarizer for optical assemblies 2 and 3, allowing them to function independently. Green light is controlled by cells 36 and 37 and magenta entrance polarizer 51, red light is controlled by cells 38 and 39 and cyan exit polarizer 54 and blue light is controlled by cell 38 in combination with retarder 38' and exit yellow polarizer 53. In optical assembly 3, retardation films 38' and 53' are properly chosen so that the polarization state of red light will not be affected by the yellow polarizer 53 and retardation film 53' combination. As a result, the transmission of red light in optical assembly 3 is controlled, with a high contrast ratio, by cells 38 and 39. Retardation film 38' as well as the orientation of the yellow polarizer 53 (which polarizes blue light) are properly chosen to ensure control of the transmission of blue light by cell 38 with a high contrast ratio. Suggested polarizers' orientation is provided by the arrows on each polarizer and is comparable to the orientation guide of FIG. 7A.

Turning to Table 6, the four cells operate to generate each primary and secondary color and black and white. Note that there are two possible switching combinations for each of the eight basic colors. The arrangement shown in FIG. 6 provides the logic between color and switching state as follows:

TABLE 6

| Optical Assembly 1 | | Optical Assembly 2 | | Binary Number or Color |
|---|---|---|---|---|
| | | Optical Assembly 3 | | Color |
| Cell 1 | Cell 2 | Cell 3 | Cell 4 | Color |
| non-selected | non-selected | non-selected | non-selected | zero = black |
| non-selected | non-selected | non-selected | selected | one = red |
| non-selected | non-selected | selected | non-selected | two = magenta |
| non-selected | non-selected | selected | selected | three = blue |
| non-selected | selected | non-selected | non-selected | four = green |
| non-selected | selected | non-selected | selected | five = yellow |
| non-selected | selected | selected | selected | six = white |
| non-selected | selected | selected | selected | seven = cyan |
| selected | non-selected | non-selected | non-selected | eight = green |
| selected | non-selected | non-selected | selected | nine = yellow |
| selected | non-selected | selected | non-selected | ten = white |
| selected | non-selected | selected | selected | eleven = cyan |
| selected | selected | non-selected | non-selected | twelve = black |
| selected | selected | non-selected | selected | thirteen = red |
| selected | selected | selected | non-selected | fourteen = magenta |
| selected | selected | selected | selected | fifteen = blue |

Yet another linear arrangement of the present invention is shown in FIG. 8, such provided without the use of color filters and with the use of even fewer components than the arrangement shown in FIG. 7. A Polarizer Orientation Guide is shown in FIG. 8A. Here, three STN cells are used as opposed to four cells so that optical assemblies 1 and 3 include single STN cell and retardation film systems and optical assembly 2 includes a dual STN cell system.

In this arrangement, the orientation of magenta polarizer 51 does not need to be in a "cross" or "parallel" direction with respect to the gray polarizer 52. Just like in the case of a monochromatic STN panel, one or two retardation films (not shown) may be placed between cell 36 and its neighboring polarizers to improve contrast. Retardation film 37' compensates cell 37 and retarder 53' acts to compensate polarizer 53. The logic between color and switching state of individual cells is summarized in Table 7. The logic for the operating of the cyan assembly is again the XOR.

TABLE 7

| Optical Assembly 1 | Optical Assembly 2 | | Binary Number or Color |
|---|---|---|---|
| | | Optical Assembly 3 | |
| Cell 1 | Cell 2 | Cell 3 | Color |
| non-selected | non-selected | non-selected | zero = black |
| non-selected | non-selected | selected | one = red |
| non-selected | selected | non-selected | two = magenta |
| non-selected | selected | selected | three = blue |
| selected | non-selected | non-selected | four = green |
| selected | non-selected | selected | five = yellow |
| selected | selected | non-selected | six = white |

TABLE 7-continued

| Optical Assembly 1 Cell 1 | Optical Assembly 2 Cell 2 | Optical Assembly 3 Cell 3 | Binary Number or Color Color |
|---|---|---|---|
| selected | selected | selected | seven = cyan |

Modifications of the embodiment shown in FIG. 8 can be arranged by interchanging the position sequence of three polarizers to give all eight colors.

The embodiment shown in FIG. 9 is similar to that shown in FIG. 8., except that the logic of the arrangement shown in FIG. 9 is described by Table 8. Cyan polarizer 54 (which polarizes one color, red)is replaced by a green polarizer (which polarizes blue and red). Moreover, the arrangement includes that colored polarizers 51 and 54 are complementary to one another, and polarizer 53 polarizes one of the two colors polarized by polarizer 54. A polarizer orientation guide is shown in FIG. 9A. Such an arrangement also provides all eight colors.

Finally, in FIG. 1 0, a final example of an arrangement incorporating the present invention is shown. In this arrangement, transmission of blue light is controlled by cells 36 and 37, following the logic of XOR, while the transmission of green light is controlled by cells 37 and 38, also following the logic of XOR. Red light, on the other hand, is controlled by a combination of cells 36, 37 and 38. When cells 36 and 37 are in the same state, red light is polarized by the first grey polarizer 51, however, it is not affected by polarizers 52 and 53. The red light will keep its linear polarization state unchanged as it passes cells 36 and 37, since these two cells compensate each other. A properly constructed cell 38 can therefore minimize red light from transmitting through the assembly from the first grey polarizer 51 to the second grey polarizer 54 when cells 36, 37 and 38 are all in the non-select state. Since blue light and green light are also blocked with cells 36, 37 and 38, all in the non-select state, black will be displayed in this situation. When cells 36, 37 and 38 are all in the select state, the situation, however, is not quite the same. Under this condition, as before, red light will keep its linear polarization unchanged as it passes cells 36 and 37. However, since the cell 38 is now in the select state, red light will pass through the assembly. The situation with cells 36 and 38 in the same state while cell 37 is in different state, is somewhat more complicated. However, the combined state of (0,1,0) is not equivalent to the combined state of (1,0,1). It is therefore possible to properly design the cell so that one of the state can be defined as what while the other one can be defined as cyan. This configuration can therefore give all the eight colors.

Here, two gray polarizers 51 and 54 and a magenta polarizer 52 (polarizes green), a yellow polarizer 53 (polarizes blue) and a cyan polarizer 55 (polarizes red) are used. A polarizer orientation guide is shown in FIG. 10A and suggested polarization directions are shown on the polarizers in FIG. 10. The cells and the polarizers are arranged so that the pairs of cells identified within the confines of optical assemblies 1 and 2 compensate each other. Optical assembly 1 and optical assembly 2 overlap one another, and optical assembly 3 overlaps both optical assemblies 1 and 2.

In this arrangement an optional optical assembly 3' is included because the arrangement without optical assembly 3' tends to allow red to transmit even when it is desired that red be blocked. Therefore, optional optical assembly 3' is added to ensure the blockage of red. However, as indicated, optical assembly 3' is optional. It is possible to chose cells and the orientations of polarizers to avoid the use of optical assembly 3'. Optical assembly 3' is shown to illustrate a method for correcting certain color leakages.

The logic between color and switching state of the embodiment shown in FIG. 10 for the case with optical assembly 3' added is shown in Table 8. The logic between color and switching state where optional optical assembly 3' is not added is shown in Table 9. In this embodiment, the operation of the first optical assembly as well as the second optical assembly follows the logic of XOR.

TABLE 8

| Optical Assembly 1 Cell 36 | Optical Assembly 2 Cell 37 | Optical Assembly 3 Cell 38 | Cell 39 | Binary Number or Color Color |
|---|---|---|---|---|
| non-selected | non-selected | non-selected | non-selected | zero = black |
| non-selected | non-selected | non-selected | selected | one = black |
| non-selected | non-selected | selected | non-selected | two = green |
| non-selected | non-selected | selected | selected | three = yellow |
| non-selected | selected | non-selected | non-selected | four = cyan |
| non-selected | selected | non-selected | selected | five = white |
| non-selected | selected | selected | non-selected | six = blue |
| non-selected | selected | selected | selected | seven = magenta |
| selected | non-selected | non-selected | non-selected | eight = blue |
| selected | non-selected | non-selected | selected | nine = magenta |
| selected | non-selected | selected | non-selected | ten = cyan |
| selected | non-selected | selected | selected | eleven = cyan |
| selected | selected | non-selected | non-selected | twelve = green |
| selected | selected | non-selected | selected | thirteen = yellow |
| selected | selected | selected | non-selected | fourteen = black |
| selected | selected | selected | selected | fifteen = red |

TABLE 9

| Optical Assembly 1 Cell 1 | Optical Assembly 2 Cell 2 | Optical Assembly 3 Cell 3 | Binary Number or Color Color |
|---|---|---|---|
| non-selected | non-selected | non-selected | zero = black |
| non-selected | non-selected | selected | one = yellow |
| non-selected | selected | non-selected | two = white (cyan) |
| non-selected | selected | selected | three = blue |
| selected | non-selected | non-selected | four = magenta |
| selected | non-selected | selected | five = cyan (white) |
| selected | selected | non-selected | six = green |
| selected | selected | selected | seven = red |

In each of the embodiments shown, each of the assemblies can be modified by rearranging, reorienting and substituting the shown color polarizers for others. Some of the retardation films can be replaced by STN cells for a higher contrast ratio.

A display subassembly according to the present invention can be incorporated into a number of direct view display systems, such as color graphics display for computers and color monitor of television sets. In direct view displays, a backlighting system that can provide the display assembly light with a substantially high degree of collimation is required to avoid parallax effects. On the viewing side of the display, it is desirable to have a diffuser screen to achieve a wide viewing angle.

Figure 11:
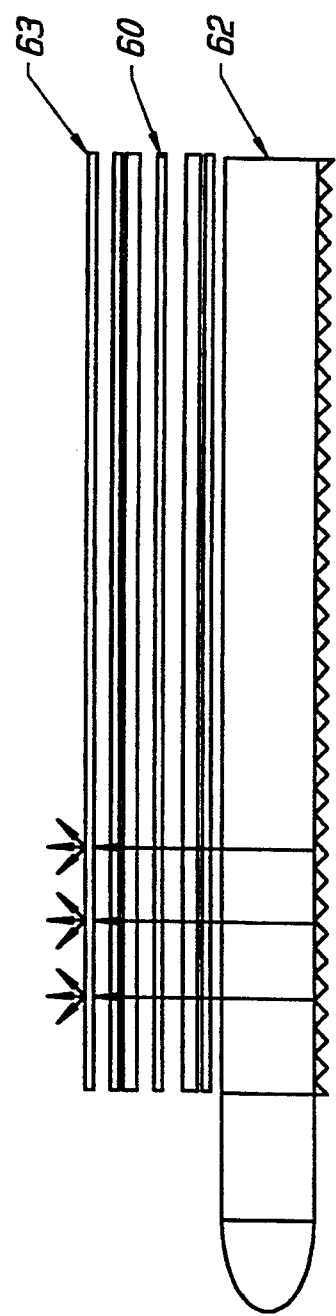
FIG. 11 shows an arrangement of a direct view display system according to the present invention.

An example direct view embodiment is shown in FIG. 11. A backlighting assembly 62 which provides a sufficiently high degree of collimated illumination is placed behind the display assembly 60. A diffuser plate 63 is placed on the exit side of the display assembly so that a real image of the picture displayed by the LCD assembly can be formed. The diffuser plate can be made of ground glass of matt plastic plates or a commercially available diffusion material (i.e. Rolux Film manufactured by the Rosco of Port Chester, N.Y.). To reduce the reflection of ambient light by the diffuser, the matt side of the diffuser should be facing the display panel and the outside flat surface may be coated with a particular anti-reflection layer. In addition, a color polarizer (blue in the example) may be placed over the diffuser and aligned in such a way that the transmission of ambient light to the diffuser can be minimized. If the diffuser does not cause depolarization, it is also possible to place the diffuser between the third polarizer and the second STN cell. In this case, the orientation of individual elements in the invented display system should be correspondingly arranged so as to ensure their maximum passage through the polarizer which is used to maximize the reduction of environment light reflection. The diffuser may also be a plate with many microlenses. Exiting collimated light will then be dispersed by the microlenses on the diffuser plate 63, thereby permitting the color image to be viewed from a wide range of angles.

Figure 12:
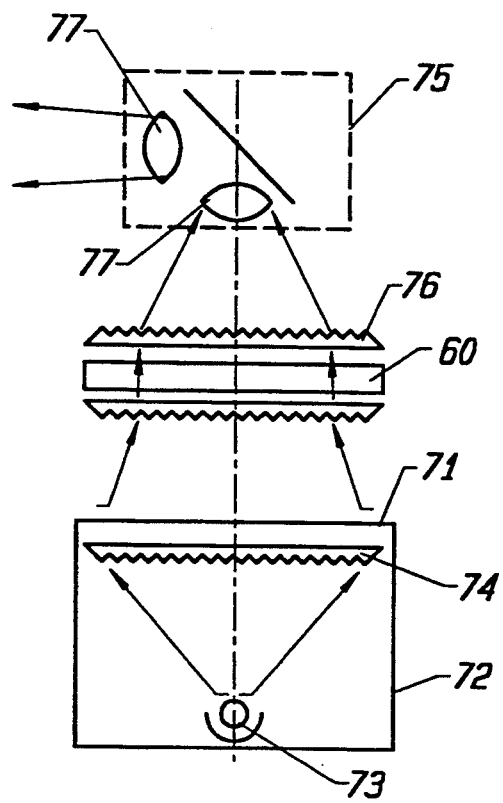
FIG. 12 shows a projection system including an overhead projector according to the present invention.

A typical projection embodiment of the invention is shown in FIG. 12, in which a display subassembly 60 is positioned on the transparent projection surface 71 of a conventional overhead projector 62. such a projector usually includes an illumination source 73 and a Fresnel lens sheet 74 under the projector surface to produce light beams that pass through a transparency and converge onto a projection lens assembly 75. When display assembly 60 is used in such an embodiment, it is desirable to provide a diverging Fresnel sheet lens to collimate the converging light from the projection surface 72 prior to illumination of the display subassembly. The light exiting the subassembly is then focused by a converging Fresnel sheet lens 76 onto the projection lens assembly 77. The converging Fresnel sheet lens is used to recover the original trace of light beams in the absence of the display subassembly.

Figure 13:
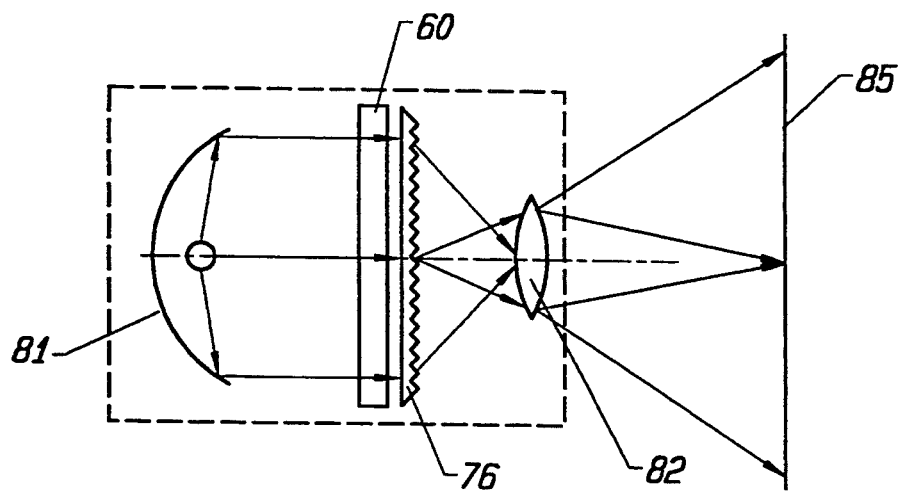
FIG. 13 shows a self-contained color display of projection type using a display assembly according to the present invention.

Projection technology may also be used to provide a self-contained display in which an image is projected onto the rear of a viewing screen. Both a color television set and a color monitor for a computer may be realized in this fashion. One of such arrangement is shown in FIG. 13. In this embodiment, a collimation reflector 81 is used to create a high intensity collimated lighting. The resulting image is projected by a Fresnel sheet lens 76 and a projection lens either onto a translucent medium 85 if the image is viewed from the opposite direction by a user or onto a reflection medium 85 if the image is viewed from the same side by a user.

There are a wide variety of embodiments to which the principals of our invention may be applied and the invented display assembly can be employed. For example, the sequence of the panels can be interchanged without affecting the properties of the system very much. As another example, additional black/white liquid crystal panels can be added to the system to achieve a better contrast ratio and generate additional gray scales. Moreover, the STN cells used in the invented display assembly can be replaced by twisted nematic, ferroelectric, and any other types of liquid crystal display panels which are based on changing light polarization state for achieving colored display. For this reason, the illustrated embodiment should be considered illustrative only and not as limiting the scope of the invention.

In accordance with the present invention, each embodiment includes three or four cells form an ordered arrangement. In various embodiments, compensation is provided by as many as three dual STN cell systems. In other embodiments, fewer dual STN cell systems are arranged, with single STN cells being coupled with retardation films. In all embodiments, exit polarizers block restored linearly polarized light so that a high contrast ratio is achieved.

We claim:

1. A liquid crystal display device for generating three primary colors and combinations thereof including black and white, using at most two adjacent discrete subpixels which together form a full color pixel, comprising:

first, second and third optical assemblies which together define either one or at most two subpixels;

said optical assemblies together include at least three liquid crystal display cells and cooperating optical components, said three liquid crystal display cells each capable of being in a select state and a non-select state at different times, and said liquid crystal display cells and said cooperating optical components being arranged in a manner which provides binary combinations of selected states and non-selected states, so that at least one of each of said colors is generated by one of said binary combinations of select states and non-select states;

wherein at least one of said optical assemblies includes two liquid crystal display cells and their respective states are controlled by the logic of EXCLUSIVE OR (XOR) so that in either state in which both liquid crystal display cells are in the same state, a particular color will be blocked and in either state in which both liquid crystal display cells are in different states, said particular one of said colors will be transmitted therethrough.

2. A device as recited in claim 1 wherein said liquid crystal display cells are twisted nematic liquid crystal display (TN LCD) panels.

3. A device as recited in claim 2, wherein:

said cooperating components include polarizers;

said first optical assembly includes first and second liquid crystal display cells and a first entrance polarizer and a first exit polarizer;

said second optical assembly includes third and fourth liquid crystal display cells and a second entrance polarizer and a second exit polarizer; and wherein said first exit polarizer and said second entrance polarizer are the same polarizer.

4. A device as recited in claim 2, wherein;

said first optical assembly includes a first liquid crystal display cell and a second liquid crystal display cell; and said second optical assembly is adjacent to said first optical assembly, said second optical assembly including a third liquid crystal display cell and a retardation film; and linear to said second optical assembly and adjacent to said first optical assembly, said third optical assembly including said fourth liquid crystal display cell and a retardation film.

5. A device as recited in claim 2, wherein;
said first optical assembly includes said first liquid crystal display cell and said second liquid crystal display cell; and
said second optical assembly is adjacent to said first optical assembly, and includes said third liquid crystal display cell and said fourth liquid crystal display cell; and
linear to said second optical assembly and adjacent to said first optical assembly, said third optical assembly includes said fourth liquid crystal display cell in a shared arrangement with said second optical assembly, and a retardation film.

6. A device as recited in claim 2, wherein;
said first optical assembly includes a first liquid crystal display cell and a second liquid crystal display cell;
linearly arranged with said first optical assembly, a second optical assembly including a third liquid crystal display cell and said fourth liquid crystal display cell; and
linearly arranged with said second optical assembly, a third optical assembly including said second liquid crystal display cell in a share arrangement with said first optical assembly and said third liquid crystal display cell in a shared arrangement with said second optical assembly.

7. A device as recited in claim 2, wherein:
said first optical assembly includes a first liquid crystal display cell and a second liquid crystal display cell;
linearly arranged with said first optical assembly, said second optical assembly including a third liquid crystal display cell and said fourth liquid crystal display cell; and
co-axially arranged with said second optical assembly, a third optical assembly includes said third liquid crystal display cell in a shared arrangement with said second optical assembly and a retardation film.

8. A device as recited in claim 2, further comprising:
an optional optical assembly, linearly aligned with said first, second and third optical assemblies, wherein said optional optical assembly includes said fourth liquid crystal display cell.

9. A device as recited in claim 1 wherein said liquid crystal display cells are supertwisted nematic liquid crystal display (STN LCD) panels.

10. A device as recited in claim 1 wherein said liquid crystal display cells are ferroelectric liquid crystal display panels.

11. A device as recited in claim 1, further comprising:
a fourth liquid crystal display cell capable of being in a select state and a non-select state at different times positioned within one of said optical assemblies; and
wherein said first, second, third and fourth liquid crystal display cells are arranged in a manner which provides binary combinations of select and non-select states, so that one of said colors is generated by at least one of said binary combinations.

12. A device as recited in claim 1 wherein two of said cells are individual cell pixels adjacent to one another on a common cell panel.

13. A device as recited in claim 1, wherein:
said cooperating components include polarizers;
said first optical assembly includes a first liquid crystal display cell and a first entrance polarizer and a first exit polarizer;
said second optical assembly includes a second and a third liquid crystal display cell and a second entrance polarizer and a second exit polarizer; and
wherein said first exit polarizer and said second entrance polarizer are the same polarizer.

14. A device as recited in claim 1, wherein said cooperating components include a plurality of polarizers; and wherein at least one of said plurality of polarizers is shared by two optical assemblies.

15. A device as recited in claim 1 wherein said cooperating components include retardation films.

16. A device as recited in claim 1, wherein:
a first liquid crystal display cell and a second liquid crystal display cell are included in said first optical assembly; and
said second liquid crystal display cell and a third liquid crystal display cell are included in said second optical assembly.

17. A device as recited in claim 1, wherein:
said first optical assembly includes a first cell and a second liquid crystal display cell;
linearly arranged with said first optical assembly, said second optical assembly includes said second liquid crystal display cell in a shared arrangement with said first optical assembly; and
linearly arranged with said first and second optical assemblies, said third optical assembly includes, in a shared arrangement with said first and second optical assemblies, said second liquid crystal display cell and further includes a third liquid crystal display cell.

18. A device as recited in claim 1, wherein:
said first optical assembly includes a first liquid crystal display cell;
linearly arranged with said first optical assembly, said second optical assembly includes a second liquid crystal display cell and a third liquid crystal display cell; and
co-axially arranged with said second optical assembly said third optical assembly includes said second liquid crystal display cell in a shared arrangement with said second optical assembly and a first retardation film.

19. A device as recited in claim 1, wherein:
said first optical assembly includes a first liquid crystal display cell and a second liquid crystal display cell;
linearly and partially co-axially arranged with said first optical assembly, said second optical assembly includes said second liquid crystal display cell in a shared arrangement with said first optical assembly and a third liquid crystal display cell; and
linearly and co-axially arranged with said second optical assembly, said third optical assembly including said first, second and third liquid crystal display cells.

20. A liquid crystal display device including three optical assemblies, each for generating one of three primary colors so that the three primary color and combinations thereof including black and white are generated, using at most two adjacent discrete subpixels which together form a full color pixel, comprising:

a first liquid crystal display cell capable of being in a select state and a non-select state at different times;

a second liquid crystal display cell capable of being in a select state and a non-select state at different times;

a third liquid crystal display cell capable of being in a select state and a non-select state at different times;

wherein said liquid crystal display cells and cooperating optical components are arranged in a manner which provides binary combinations of selected states and non-selected states, so that at least one of each of said colors is generated by one of said binary combinations of select states and non-select states; and wherein two of said liquid crystal display cells are included in an optical assembly such that their respective states are controlled by EXCLUSIVE OR (XOR) logic so that in either state in which both liquid crystal display cells are in the same state, a particular color will be blocked, and in either state in which both liquid crystal display cells are in different states, said particular one of said colors will be transmitted therethrough.

21. A device as recited in claim 20 wherein said cooperating optical components include an entrance polarizer and an exit polarizer for each of said optical assemblies.

22. A device as recited in claim 20 wherein said compensating optical components include retardation films.

23. A device as recited in claim 20 wherein said liquid crystal display cells are twisted nematic liquid crystal display (TN LCD) panels.

24. A device as recited in claim 20 wherein said liquid crystal display cells are supertwisted nematic liquid crystal display (STN LCD) panels.

25. A device as recited in claim 20 wherein said liquid crystal display cells are ferroelectric liquid crystal display panels.

26. A method for arranging optical components so that they generate three primary colors, the three complementary colors and black and white, comprising the steps of:

providing first, second and third optical assemblies, each for controlling a different primary color;

including in said optical assemblies a least three liquid crystal display cells and cooperating optical components, said three liquid crystal display cells each capable of being in a select state and a non-select state at different times;

arranging said first, second and third liquid crystal display cells in a manner which provides binary combinations of select states and non-select states so that each of said colors is generated by one of said binary combinations of select states and non-select state, and including in at least one of said optical assemblies, two liquid crystal display cells, so that their respective states are controlled by EXCLUSIVE OR (XOR) logic so that in either state in which both liquid crystal display cells are in the same state, a particular color will be blocked, ad in either state in which both liquid crystal display cells are in different states, said particular one of said colors will be transmitted therethrough.

27. A method as recited in claim 26 wherein said liquid crystal display cells are twisted nematic liquid crystal display (TN LCD) panels.

28. A method as recited in claim 26 wherein said liquid crystal display cells are supertwisted nematic liquid crystal display (STN LCD) panels.

29. A method as recited in claim 26 wherein said liquid crystal display cells are ferroelectric liquid crystal display panels.

30. A method as recited in claim 26 further comprising the steps of:

including in one of said optical assemblies a fourth liquid crystal display cell capable of being in a select state and a non-select state at different times; and arranging said first, second, third and fourth liquid crystal display cells in a manner which provides binary combinations of select states and non-select states so that each of said colors is generated by at least one of said binary combinations of select states and non-select state.

31. A method recited in claim 30, further comprising the steps of:

positioning polarizers to cooperate with said liquid crystal display cells;

including in said first optical assembly, a first liquid crystal display cell, a first entrance polarizer and a first exit polarizer;

including in said second optical assembly, a second liquid crystal display cell, a third liquid crystal display cell, a second entrance polarizer and a second exit polarizer; and positioning said first exit polarizer so that it also acts as said second entrance polarizer.

32. A method as recited in claim 30, further comprising the steps of:

positioning polarizers to cooperate with said liquid crystal display cells;

including in said first optical assembly, a first liquid crystal display cell, said second liquid crystal display cell, a first entrance polarizer and a first exit polarizer;

including in said second optical assembly, a third liquid crystal display cell, a said fourth liquid crystal display cell, a second entrance polarizer and a second exit polarizer; and positioning said first exit polarizer so that it also acts as said second entrance polarizer.

33. A liquid crystal display device for generating three primary colors and combinations thereof including black and white, each of said primary colors generated by a different optical assembly, said device using at most two adjacent discrete subpixels which together form a full color pixel, comprising:

a first optical assembly for controlling a first primary color;

a second optical assembly, neighboring said first optical assembly, said second optical assembly for controlling a second primary color;

a third optical assembly, neighboring said second optical assembly, said third optical assembly for controlling a third primary color;

a first liquid crystal display cell capable of being in a select state and a non-select state at different times positioned within said first optical assembly;

a second liquid crystal display cell capable of being in a select state and a non-select state at different times positioned within one of said optical assemblies;

a third liquid crystal display cell capable of being in a select state and a non-select state at different times positioned within one of said optical assemblies;

wherein said first, second and third liquid crystal display cells are ordered in a manner which provides binary combinations of select states and non-select states so that each of said colors is generated by one of said binary combinations of select states and non-select states; and wherein at least one of said optical assemblies includes two liquid crystal display cells and their respective states are controlled by EXCLUSIVE OR (XOR) logic so that in either state in which both liquid crystal display cells are in the same state, a particular color will be blocked, and in either state in which both liquid crystal display cells are in different states, said particular one of said colors will be transmitted therethrough.

34. A device as recited in claim 33 wherein said liquid crystal display cells are twisted nematic liquid crystal display (TN LCD) panels.

35. A device as recited in claim 33 wherein said liquid crystal display cells are supertwisted nematic liquid crystal display (STN LCD) panels.

36. A device as recited in claim 33 wherein said liquid crystal display cells are ferroelectric liquid crystal display panels.

37. A device as recited in claim 33 further comprising cooperating optical components, such including retardation films.

38. A device as recited in claim 33 further comprising cooperative optical components, such including an entrance polarizer and an exit polarizer for each of said optical assemblies.

39. A device as recited in claim 33 further comprising cooperative optical components, such including a backlighting system.

40. A device as recited in claim 33 further comprising cooperative optical components, such including a projection lens system.

* * * * *